United States Patent [19]

Watkins

[11] 4,229,099
[45] Oct. 21, 1980

[54] METHOD AND APPARATUS FOR BURNING OR DODGING PRESELECTED PORTIONS OF AN IMAGE FORMED ON PHOTOGRAPHIC PAPER

[76] Inventor: Ronald C. Watkins, 263 W. Tulpehocken St., Philadelphia, Pa. 19144

[21] Appl. No.: 972,608

[22] Filed: Dec. 22, 1978

[51] Int. Cl.³ .................... G03B 27/72; G03B 27/32
[52] U.S. Cl. .................................. 355/71; 354/291; 354/296; 355/77; 430/394
[58] Field of Search ............... 355/40, 77, 71, 125; 354/291, 292, 296; 96/41

[56] References Cited

U.S. PATENT DOCUMENTS

| | | | |
|---|---|---|---|
| 1,863,827 | 6/1932 | Briel | 430/394 |
| 2,048,876 | 7/1936 | Marx, Jr. | 355/77 |
| 2,958,270 | 11/1960 | Higonnet et al. | 354/18 |
| 3,202,045 | 8/1965 | Arsenault et al. | 355/40 |
| 3,204,520 | 9/1965 | Grube | 354/11 |
| 3,449,048 | 6/1969 | Allison | 355/40 |
| 3,499,377 | 3/1970 | Esses | 354/292 |
| 3,508,826 | 4/1970 | Grabau | 355/40 |
| 3,573,910 | 4/1971 | Guiliani | 96/41 |
| 3,674,487 | 7/1972 | Druschel | 96/41 |
| 3,771,872 | 11/1973 | Nightingale et al. | 355/125 |
| 3,784,380 | 1/1974 | Compare | 96/44 |
| 4,028,107 | 6/1977 | Henley | 96/41 |
| 4,045,133 | 8/1977 | Carlson | 355/714 |

*Primary Examiner*—Richard A. Wintercorn
*Attorney, Agent, or Firm*—Seidel, Gonda, Goldhammer & Panitch

[57] ABSTRACT

A method and apparatus for burning or dodging selected areas of an image formed on photographic paper from a developed negative. A frame is provided with plural spaced light transmissive elements arranged in a grid. To dodge preselected areas of the image formed on photographic paper, one or more cut-outs of light blocking material are placed at selected locations on the grid. To burn preselected areas of the image, a sheet of light blocking material having one or more apertures (shaped as desired) is placed on the grid. In burning and dodging, the frame is held between the developed negative and the photographic paper. Each of the cut-outs may be provided with a tab-like element to facilitate placement of the cut-out on the grid.

11 Claims, 4 Drawing Figures

U.S. Patent  Oct. 21, 1980  4,229,099
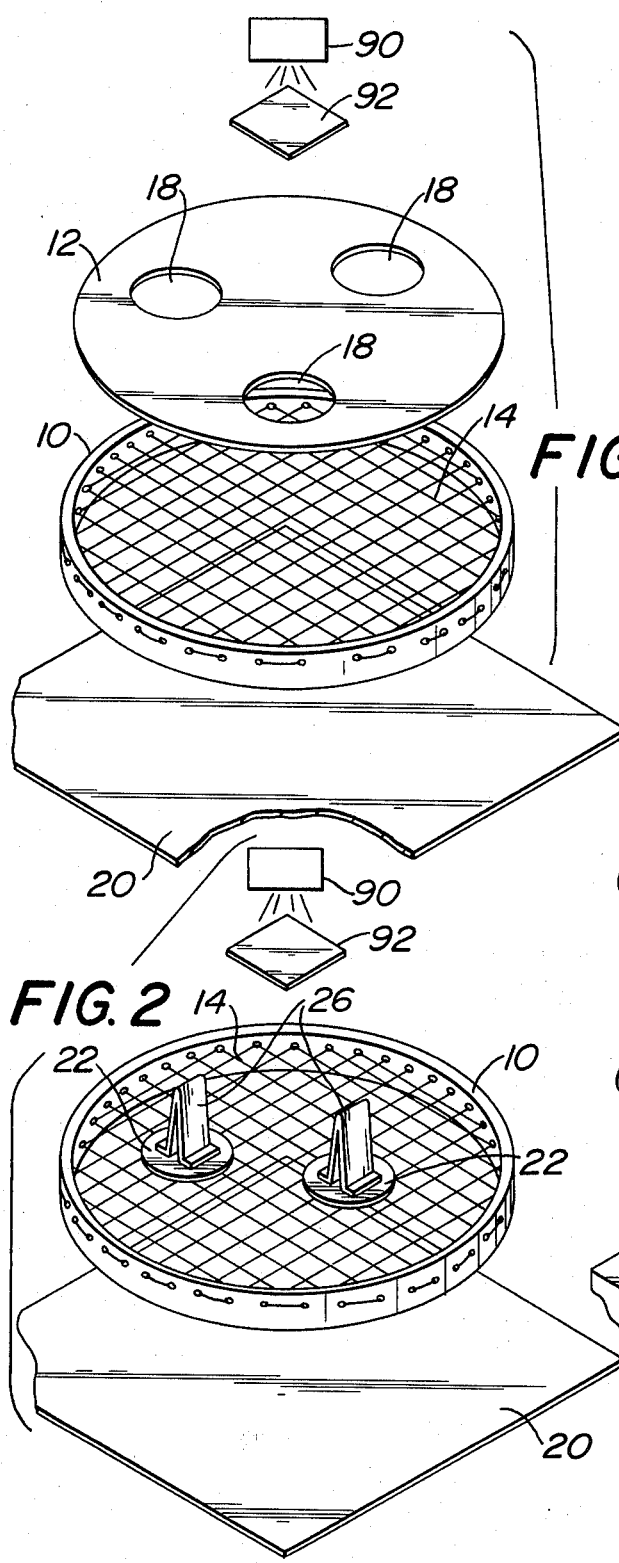
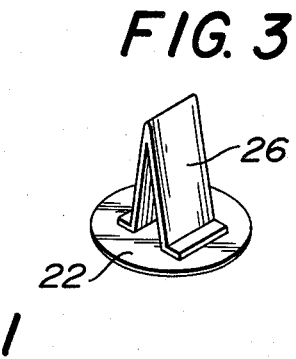
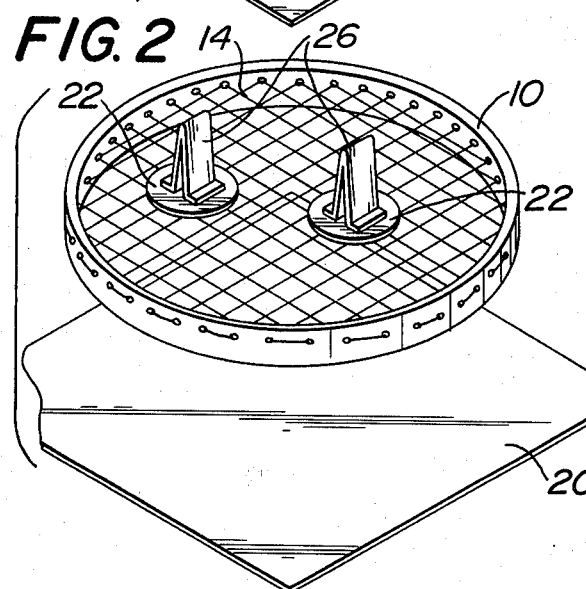
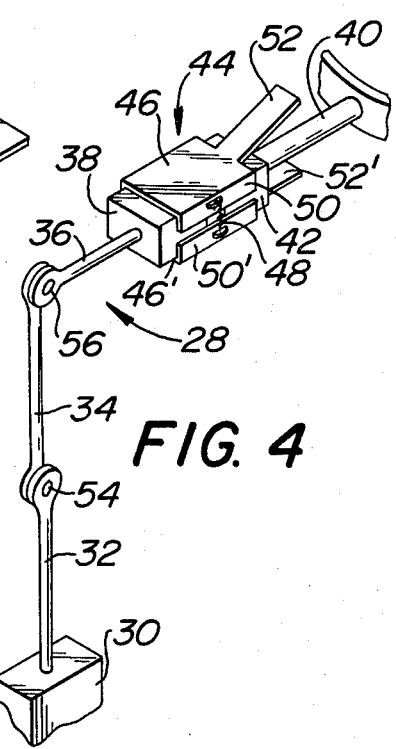

METHOD AND APPARATUS FOR BURNING OR DODGING PRESELECTED PORTIONS OF AN IMAGE FORMED ON PHOTOGRAPHIC PAPER

BACKGROUND OF THE INVENTION

The invention is directed to a method and apparatus for use in burning and dodging selected areas of an image formed on photographic paper from a developed negative.

The invention is particularly directed to a frame having plural spaced light transmissive elements preferably arranged in a grid pattern. One or more cut-outs of light blocking material may be placed on the filaments to dodge selected areas on the photographic paper. A sheet of light blocking material having one or more apertures may be placed on the grid to burn selected areas on the photographic paper.

By "burning" is meant giving additional exposure to part of the image projected on the photographic paper to make that part of the image darker. By "dodging" is meant holding back the imageforming light from a part of the photographic paper to make that part of the image lighter.

By "photographic paper" is meant light-sensitive paper used to produce an image from a developed negative. The photographic and physical characteristics of such paper are well-known and are described in the literature.

Heretofore, a selected area of a photographic paper could be dodged by holding a piece of cardboard or plastic light blocking material between the negative and the photographic paper during the printing operation. A stiff wire or other makeshift handle could be attached to the light-blocking material to facilitate placement of the material at the desired location between the negative and the photographic paper without obstructing the path of light to the paper by the user's hand.

Generally, the light blocking material is opaque so that the user cannot view the image being formed on the photographic paper through the material. Accordingly, initial alignment of the material to dodge the precise area of interest on the paper is somewhat difficult.

In addition, this technique permits only one area of the paper to be dodged at any given instant of time. If more than one area on the paper must be dodged, it is necessary to manipulate the light blocking material between two or more locations to alternatively block light from reaching each of the areas of interest on the paper. This may be difficult and, in some cases, impossible to do with accuracy.

The present invention permits accurate alignment of the light blocking material with the precise area to be dodged on the photographic paper.

The invention also permits the simultaneous dodging of more than one area on the photographic paper.

The invention also permits the rapid and accurate burning of more than one area of the photographic paper.

Heretofore, in burning a selected area on the photographic paper, a sheet of black plastic material was provided with one or more apertures and mounted on a piece of cardboard or the like. The cardboard itself was provided with an aperture. The plastic material could be rotated to bring any one of the apertures in the plastic into alignment with the aperture in the cardboard to burn a selected area of the photographic paper. Two or more spaced areas on the photographic paper could not be simultaneously burned.

In addition, alignment of the apertures in the plastic and cardboard with the precise area of interest on the photographic paper was troublesome.

By the present invention, several areas on the photographic paper can be burned simultaneously and with increased accuracy.

SUMMARY OF THE INVENTION

Plural spaced light transmissive elements are secured to a frame. To dodge preselected areas of the photographic paper, one or more cut-outs of light blocking material are placed on the elements. Each of the cut-outs may be provided with a tab-like member to facilitate the grasping and placement of the cut-outs on the light transmissive elements. To burn one or more preselected areas on the photographic paper, a sheet of light blocking material is provided with one or more apertures, and the sheet of material is placed on the light transmissive elements.

To facilitate initial alignment of the frame and the cutouts or the sheet of light blocking material with the photographic paper, the frame may be provided with an arm which is insertable in an adjustable support. After initial alignment of the frame, the frame may be separated from the support and gently moved to achieve the desired dodging or burning effect.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is an exploded perspective view of an apparatus for burning preselected portions of an image according to the invention.

FIG. 2 is a perspective view of an apparatus for dodging preselected portins of an image according to the invention.

FIG. 3 is a perspective view of a cut-out of light blocking material used in the dodging process.

FIG. 4 is a perspective view of an adjustable support for the frame.

DETAILED DESCRIPTION OF THE PREFERRED EMBODIMENT

Referring to the drawings in detail, wherein like numerals indicate like elements, there is shown in FIG. 1 a frame 10 and a sheet of light blocking material 12 for use in burning a photographic print.

The frame 10 may be of any desired size and shape. In the preferred embodiment, a circular hardwood frame is employed.

A grid 14 of plural spaced light transmissive elements is secured to the frame. The grid 14 may be formed by stringing a suitable light transmissive filamentary material across the frame 10. Holes 16 may be drilled in the frame 10 and the filamentary material may be strung on the frame in a manner similar to stringing a tennis racket. In the preferred embodiment, nylon filaments are used. The nylon filaments are transparent and nonconductive. Accordingly, there is no electrical hazard and no significant attenuation of the light passing through grid 14. A glass plate could be mounted on the frame 10 instead of the filaments 14. However, nylon grid is preferred as it is lightweight and will not collect dust.

The sheet of light blocking material 12 may be a red acetate material. The red acetate material passes only red light to the photographic paper 20. Most photographic paper, however, is not sensitive to red light.

If the photographic paper is sensitive to red light but is not sensitive to another color light, then another color acetate should be used. For example, amber and yellow acetate are possible substitutes if the photographic paper is not sensitive to amber or yellow light.

Of course, the sheet 12 may be made of a black material in which case no light would be transmitted by the material to the photographic paper. However, it is preferred that the sheet 12 be transparent to at least the particular color light to which the photographic paper is not sensitive. Thus, the user of the apparatus can more readily align the areas to be burned on the paper by viewing the paper 20 through the sheet 12.

The sheet 12 is cut such that its over-all dimensions correspond to the dimensions of frame 10. The apertures 18 are cut in the sheet 12 in a pattern corresponding to the pattern of the selected areas on the paper 20 which are to be burned. Light passing through the apertures 18 will darken the paper 20 at the selected areas.

The apparatus for dodging a photographic print is shown in FIG. 2. The dodging apparatus comprises the frame 10 and one or more cut-outs of light blocking material 22 placed at desired locations on the grid 14. Each cut-out 22 is provided with a tablike member 26 secured thereto by adhesive or the like. See FIG. 3. The tab-like member 26 facilitates grasping and placement of the cut-out on the grid 14. In the preferred embodiment, the cut-out 22 is a red acetate material although, as mentioned above, any suitable color material may be used depending on the particular color of light to which paper 20 is not sensitive. A colored acetate which transmits light to which the paper is not sensitive is preferred because it allows the user to align the cut-out 22 with the area on paper 20 which is to be dodged by viewing the paper through the cut-out.

The cut-outs 22 are made in any desired shape and size. The user can make any shape, regular or irregular, which is necessary to obtain satisfactory results in dodging the desired areas on the paper 20.

The use of the above described dodging apparatus will result in a brightening of the paper 20 in the areas which are shadowed by the cut-outs 22.

In the preferred embodiment, an adjustable support 28 is employed to support the frame 10 above the paper 20 during initial alignment. See FIG. 4. The support 28 comprises a base 30, first link 32, second link 34, third link 36, and a block 38 secured to the link 36. Support arm 28 has two pivot points 54 and 56 which connect the links 32, 34 and 36 and allow the arm 28 to be adjusted to place the frame 10 at the desired location between a light source 90 and a developed negative 92. See FIGS. 1 and 2.

The frame 10 is provided with an arm 40. A block 42 is secured to the arm 40. The block 38 and the block 42 are held in alignment by a quick release clamp 44. The clamp 44 comprises two identical spring members 46, 46' which are coupled on each side (only one of which is shown in FIG. 4) by a spring such as spring 48. Each member 46, 46' is provided with a flange 50, 50' on each side to grip the blocks 38 and 42. The members 46, 46' have cantilever portions 52, 52' respectively which extend beyond the end of block 42.

The clamp 44 is employed to initially align the frame 10 (and cut-outs 22 or apertures 18) with the areas on the photographic paper 20 to be dodged or burned. After the initial dodging or burning operation, the selected areas on the paper 20 must be blended with adjacent areas on the paper. The blending process softens the sharp contrast between the dodged or burned areas and adjacent areas on the paper 20. Blending may be performed manually after the desired results from the burning or dodging operation have nearly been obtained. As described more fully below, to blend the dodged or burned areas with the adjacent areas on the paper 20, the frame 10 must be moved gently back and forth. The arm 40 may be grasped by the user to move the frame 10 during the blending operation.

When the user wishes to blend the dodged or burned areas with adjacent areas on the paper 20, he presses the cantilever portions 52, 52' toward each other. This forces spring members 46, 46' apart to release block 38. The arm 40 can then be grasped to withdraw the frame 10 from support 28 so that the frame 10 can be moved during the blending operation.

In operation, selected areas of the paper 20 are burned by forming apertures 18 in sheet 12 corresponding to the shapes and sizes of the areas on paper 20 which are to be darkened. The frame 10 held by support 28 in place between negative 92 and the paper 20. The sheet 12 is placed on the grid 14. The light source 90 is then turned on and the selected areas on the paper 20 are burned. After the desired burning effect is nearly obtained the quick release clamp 44 is operated to release support 28 and frame 10, and the frame is gently moved to blend the burned areas with the adjacent areas on paper 20.

The dodging process is similar to the burning process described above except that the cut-outs 22, corresponding to the areas of the paper to be dodged, are used instead of the sheet 12. The frame 10 is coupled to support 28. The cut-outs 22 are placed on the grid 14 in the desired positions, and the paper 20 is exposed to light until the desired areas are lightened. The blending process can then be conducted as above after releasing frame 10 from support 28.

As compared to prior art methods and apparatus, the present invention has a number of important advantages: The device is simple to use; the support 28 allows precise alignment of the cutouts 22 or apertures 18 with the areas which are to be dodged or burned; more than one area can be burned or dodged at a time; the cut-outs 22 and sheet 12 transmit only light to which paper 20 is not sensitive so that the user can accurately align the cut-outs or apertures with the selected areas on paper 20 by viewing the paper through the cut-outs 22 or the sheet 12; and the only movement necessary is that which occurs in the blending process.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for selectively dodging preselected portions of an image formed on photographic paper by a light source from a developed negative, comprising:

light transmissive support means disposed between said negative and paper for transmitting light to said paper;

at least one cut-out having a lesser surface area than the photographic paper, said cut-out comprising a material which blocks light to which the photographic paper is sensitive to prevent such light from reaching a preselected portion of said paper and which passes light to which the photographic paper is not sensitive to permit viewing of said paper through said cut-out to align said cut-out with said preselected portion of said paper, said cut-out being disposed on said support means;

whereby said support means transmits light to which said paper is sensitive to expose said paper and said cut-out blocks light to which said paper is sensitive to effect dodging of said preselected portion of said paper.

2. Apparatus according to claim 1 wherein said light transmissive support means comprises a grid of nylon filaments.

3. Apparatus according to claim 1 wherein said cut-out is an acetate material.

4. Apparatus according to claim 1 wherein said cut-out is provided with a tab-shaped member secured thereto.

5. Apparatus for selectively burning preselected portions of an image formed on photographic paper by a light source from a developed negative, comprising:

light transmissive support means disposed between said negative and paper for transmitting light to said paper;

at least one sheet of a material having one or more apertures, said sheet being disposed on said support means, said material blocking light to which the photographic paper is sensitive to prevent such light from reaching a first preselected portion of said paper, said material passing light to which the photographic paper is not sensitive thereby permitting viewing of said paper through said sheet and said one or more apertures to align said one or more apertures with at least a second preselected portion of said paper;

whereby said material blocks light to which said paper is sensitive and said one or more apertures pass light to which said paper is sensitive to effect burning of said second preselected portion of said paper.

6. Apparatus according to claim 5 wherein said light transmissive support means comprises a grid of nylon filaments.

7. Apparatus according to claim 5 wherein said sheet is an acetate material.

8. A method of dodging at least a preselected portion of an image formed by a light source on photographic paper from a developed negative, comprising:

placing plural spaced light transmissive elements between said negative and said photographic paper;

placing at least one cut-out of a material which blocks light to which the photographic paper is sensitive and which passes light to which the photographic paper is not sensitive on said light transmissive elements;

aligning said cut-out with the preselected portion of said photographic paper to be dodged; and exposing said photographic paper to light transmitted through said light transmissive elements while blocking light to which said paper is sensitive from reaching said preselected portion of said paper aligned with said cut-out.

9. The method according to claim 8 including moving said frame to blend the edges of said preselected portion of said photographic paper aligned with said cut-out with adjacent portions of said photographic paper.

10. A method of burning at least a preselected portion of an image formed by a light source on photographic paper, from a developed negative, comprising:

placing plural spaced light tranmissive elements between said negative and said photographic paper;

placing on said light transmissive elements a sheet of material which blocks light to which the photographic paper is sensitive and which passes light to which the photographic paper is not sensitive and which has at least one aperture;

aligning said aperture with the preselected portion of said paper to be burned; and exposing said preselected portion of said photographic paper aligned with said aperture while blocking light to which said paper is sensitive from reaching the portion of said photographic paper adjacent to said preselected portion of said paper which is aligned with said aperture.

11. The method according to claim 10 including moving said frame to blend the preselected portion of said photographic paper aligned with said aperture with said adjacent portion of said photographic paper.

* * * * *